United States Patent [19]
Maeda et al.

[11] Patent Number: 5,790,603
[45] Date of Patent: Aug. 4, 1998

[54] COMMUNICATION APPARATUS WITH COLLISION DETECTION AND EDGE DETECTION FOR TRANSMITTING AND RECEIVING DATA

[75] Inventors: Kouichi Maeda, Anjo; Hideaki Ishihara, Okazaki; Tengo Fujii; Akihiro Sasaki, both of Anjo; Yasushi Kanda, Aichi-ken, all of Japan

[73] Assignee: Nippondenso Co., Ltd., Kariya, Japan

[21] Appl. No.: 546,847

[22] Filed: Oct. 23, 1995

[30] Foreign Application Priority Data

Oct. 21, 1994 [JP] Japan ................ 6-256725

[51] Int. Cl.$^6$ ........................... H04L 7/00
[52] U.S. Cl. ................ 375/342; 375/316; 375/355; 395/200.3
[58] Field of Search ................ 370/445, 448; 375/257, 355, 342, 316; 395/200.2, 200.3

[56] References Cited

U.S. PATENT DOCUMENTS

| | | | |
|---|---|---|---|
| 4,989,223 | 1/1991 | Katayose et al. | 377/39 |
| 5,122,778 | 6/1992 | Erhart et al. | 340/146.2 |
| 5,315,299 | 5/1994 | Matsumoto | 341/53 |
| 5,402,420 | 3/1995 | Kobayashi | 370/212 |
| 5,436,853 | 7/1995 | Shimohara | 364/569 |
| 5,459,751 | 10/1995 | Okamoto | 375/354 |
| 5,659,548 | 8/1997 | Okamoto et al. | 371/20.5 |
| 5,684,838 | 11/1997 | Kanda et al. | 375/342 |

FOREIGN PATENT DOCUMENTS 5-211511  8/1993  Japan .

Primary Examiner—Eddie P. Chan
Assistant Examiner—Hong Kim
Attorney, Agent, or Firm—Cushman Darby & Cushman IP Group of Pillsbury Madison & Sutro LLP

[57] ABSTRACT

A communication apparatus is used in a communication system, having a communication line, where an operation timing in each of the communication apparatus is coupled to the communication line and synchronized with the received signals in each of the communication apparatus. This communication apparatus comprises a signal-chip microprocessor having a central processing unit for executing main and interruption processing, a register storing data to be transmitted next, an output buffer for transmitting the transmission data, and an edge detector for detecting an edge in the communication line. The output buffer is directly responsive to an edge detection circuit, so that the transmission data can be immediately transmitted in response to the detection of an edge without a variable delay time caused by the operation condition which may be varied by the interruption processing or like.

18 Claims, 12 Drawing Sheets

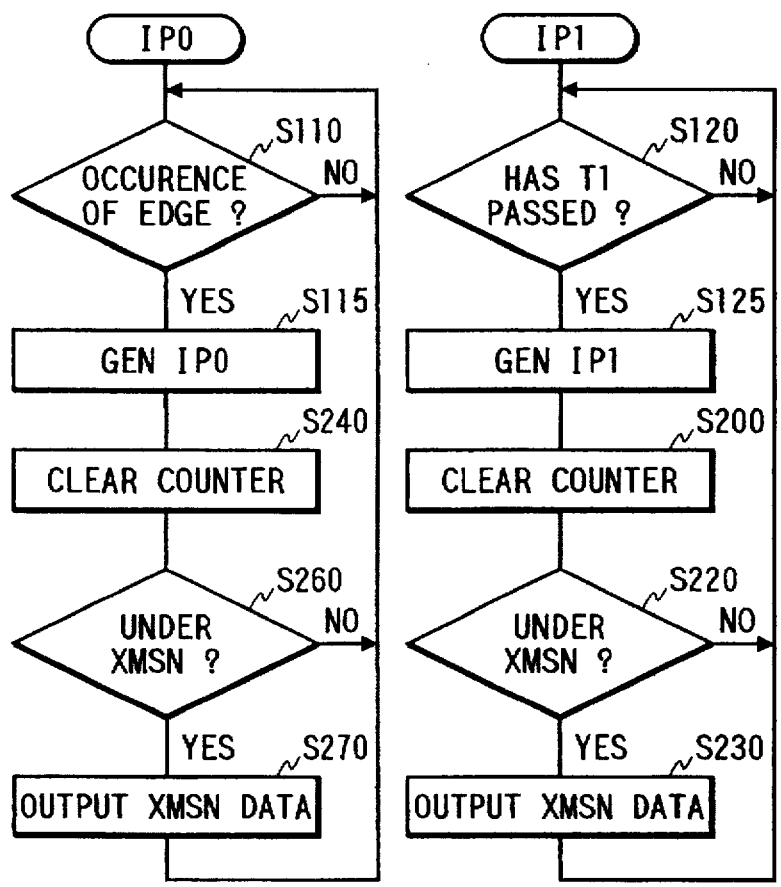

COMMUNICATION APPARATUS WITH COLLISION DETECTION AND EDGE DETECTION FOR TRANSMITTING AND RECEIVING DATA

BACKGROUND OF THE INVENTION

1. Field of the Invention

This invention relates to a communication apparatus for communicating with another communication apparatus through a communication line with serial data.

2. Description of the Prior Art

A known communication apparatus includes a transmission circuit for transmitting serial data, to a communication line, a receiving circuit for receiving the serial data from another communication apparatus through the communication line, and a control circuit for executing various processing for communication using CSMA/CD (carrier sensitive multiple access with collision detection).

In such a CSMA/CD communication system, each communication apparatus starts transmitting when no data is transmitted from another communication apparatus and while data is transmitted, the communication apparatus transmitting data detects for collisions of the transmitted data. When a collision is detected, the communication apparatus transmitting data stops transmitting data until a predetermined condition is satisfied.

Moreover, in the CSMA/CD method, when a collision occurs, any communication apparatus transmitting data should stop transmitting data. In another prior art communication apparatus which prevents this problem, data corresponding to a voltage level of the communication line when no data is transmitted (passive level) has a low priority and data having the opposite voltage level (dominant level) has a high priority. When a collision occurs, the communication apparatus transmitting data having a high priority is allowed to transmit the data. Such a prior art communication system is known as a communication apparatus additionally having a non-destructive arbitration function.

In such a communication system, the communication apparatus transmitting data confirms whether or not the data transmitted by itself appears on the communication line, one bit by one bit, and the communication apparatus stops the transmitting data when the data appearing on the communication line is not the same as the data which was transmitted by itself.

On the other hand, in such a communication apparatus, an one-bit interval for determining a transmitting timing, an interval for sampling data from a start of the one bit interval, and other intervals are measured on the basis of a basic clock signal generated by a clock signal provided to each communication apparatus. Therefore, the timings of changing of transmission data and sampling deviate between respective communication apparatus. If this deviation is larger than a predetermined range, the non-destructive arbitration function of one bit by one bit cannot be provided.

In order to prevent this deviation in the phase of clock signal, a start-stop synchronization method is provided. In this method, a communication apparatus transmits data when an edge is detected on the communication line and all other communication apparatus coupled to the communication line restart the timing of the one-bit interval and the sampling interval on the basis of the timing of the edge detection. Therefore, if one communication apparatus transmits data at an earlier timing or in an advance phase condition in the clock signal, the other communication apparatus synchronise the clock signals with the clock signal of the communication apparatus transmitting the data at the earlier timing or in the advance phase condition to prevent the phases of the clock signals in respective communication apparatus from gradually deviate each other.

Another communication apparatus for communication with the non-destructive arbitration such as the start-stop synchronization method comprises a single-chip microprocessor for controlling the communication.

FIG. 11 is a block diagram of a prior art microprocessor used in the prior art communication apparatus employing the non-destructive arbitration. This microprocessor of the communication apparatus comprises a central processing unit (cpu) 71, a ROM 73, RAM 75, a counter which is always driven by a system clock, at least two first and second comparing registers 79 and 81, a first comparator 83 for generating and supplying a first timer interruption signal 11 to the central processing unit 71 when the count value in the counter 77 agrees with the first comparing register 79, and a second comparator 85 for generating and supplying a second timer interruption signal 12 to the central processing unit 71 when the count value in the counter 77 agrees with the second comparing register 81, an edge detection circuit 87 for supplying an edge interruption signal IE to the central processing unit 71 when an edge occurs in the receive data from the receiving circuit externally provided (not shown). The microprocessor further includes an edge detection interval storing register 89 for storing the count value in the counter 77 when the edge interruption signal IE is outputted, a transmission data register in which data to be transmitted is written by the central processing unit 71, and an outputting buffer 93 for sending the data from the transmission data register 91 to an externally provided transmission circuit (not shown) with the transmission data latched.

In such a prior art communication apparatus, the data is outputted by the central processing unit and the transmission circuit through an interruption processing responsive to the edge interruption signal IE. However, when an edge occurs in the received signal while the central processing unit executing an interruption processing responsive to the second timer interruption, the central processing unit 71 cannot immediately execute the edge interruption processing for transmitting data. Therefore, in such a prior art communication apparatus employing the start-stop synchronization method using a microprocessor, there is an undesirable delay in the transmission of data.

SUMMARY OF THE INVENTION

The aim of the present invention is to provide an improved communication apparatus.

A communication apparatus for transmitting serial data having H and L levels through a communication line is used in a communication system, where an operation timing in each communication apparatus is coupled to the communication line and synchronized with the received signals in each of the communication apparatus. This communication apparatus comprises a signal-chip microprocessor having a central processing unit for executing main and interruption processings, a register storing data to be transmitted next, an output buffer for transmitting the transmission data, and an edge detector for detecting an edge in the communication line. The output buffer is directly responsive to an edge detection circuit, so that the transmission data can be immediately transmitted in response to the detection of an edge without a variable delay time caused by the operation condition which may be varied by the interruption processing or like.

According to this invention, there is a communication apparatus, coupled to a communication line, for transmitting data to and receiving the transmitted data from another communication apparatus, comprising a single chip microprocessor including a hardware circuit portion (logic circuits, registers) and a software driven portion for controlling the hardware circuit portion and preparing transmission data, the hardware portion having: an edge detection circuit for detecting an edge on the communication line and generating an edge from the transmitted data detection signal; a first time measuring circuit for measuring a first predetermined time interval of one bit of the data in response to the edge detection signal; a second time measuring circuit for measuring a second predetermined time interval shorter than the first predetermined time interval in response to the edge detection signal; a sampling circuit for sampling the data on the communication line in response to the second time measuring circuit. The single chip microprocessor further including a transmission data storing circuit for storing the transmission data; a data writing circuit for writing the transmission data from the software driven portion in the transmission data storing circuit in response to the second time measuring circuit; and a data output circuit for receiving and holding the transmission data from the transmission data storing circuit and transmitting the transmission data to the communication line as the data in response to the edge detection signal and the first time measuring circuit.

In the communication apparatus, the hardware circuit may further comprise a next transmission data storing circuit for storing the transmission data from the software driven portion and supplying the transmission data to the transmission data storing circuit. The data writing circuit writes the transmission data from the next transmission data storing circuit into the transmission data storing circuit in response to the second time measuring circuit. The software driven portion further comprises a writing portion responsive to the edge detection signal and the first time measuring circuit for writing the transmission data from the software driven portion into the next transmission data storing circuit.

In the communication apparatus, the hardware circuit portion may further comprise a comparing circuit for comparing the data sampled by the sampling circuit with the transmission data supplied to the communication line generated just before the sampling circuit samples the data and for inhibiting the data output circuit from transmitting the transmission data to the communication line when the data sampled by the sampling circuit does not agree with the transmission data supplied to the communication line. The software driven portion may further comprise a judging portion for judging whether or not a predetermined condition of transmitting the transmission data by the data output circuit is established and for inhibiting the data output circuit to transmit the transmission data to the communication line when the predetermined condition is not established until the predetermined condition is established. In this case, the software driven portion may further comprise an inhibiting portion for inhibiting the comparing circuit from permitting the data output circuit to transmit the transmission data to the communication line in response to the second time measuring circuit.

In the communication apparatus, the hardware circuit portion may further comprise a data output inhibiting circuit for inhibiting the data output circuit from transmitting the transmission data to the communication line.

In the communication apparatus, the software driven portion may further comprise an edge data output inhibiting portion for inhibiting the data output circuit from transmitting the transmission data to the communication line.

In the communication apparatus, the hardware circuit portion further comprises a clock circuit for generating a clock signal and at least one of the first and second time measuring circuits comprises a counting circuit for counting the clock signal, a register for holding a predetermined value, and a comparing circuit for comparing a count value in the counting circuit with the predetermined value in the first register.

In the communication apparatus, the hardware circuit portion may further comprise a clock circuit for generating a clock signal and a counting circuit for counting the clock signal, the first time measuring circuit may comprise a first register for holding a first predetermined values and a first comparing circuit for comparing a count value in the counting circuit with the first predetermined value in the first register, and the second time measuring circuit may comprise a second register for holding a second predetermined value and a second comparing circuit for comparing a count value in the counting circuit with the second predetermined value in the second register.

BRIEF DESCRIPTION OF THE DRAWINGS

The object and features of the present invention will become more readily apparent from the following detailed description taken in conjunction with the accompanying drawings in which:

FIGS. 5A to 5C are diagrams of flow charts of this embodiment;

The same or corresponding elements or parts are designated with like references throughout the drawings.

DETAILED DESCRIPTION OF THE INVENTION

A data communication system of an embodiment of this invention is provided to a vehicle (not shown). The data communication system includes a plurality of communication apparatus communicating with each other using the start-stop synchronous system to drive or control various actuators or the like.

Figure 1:
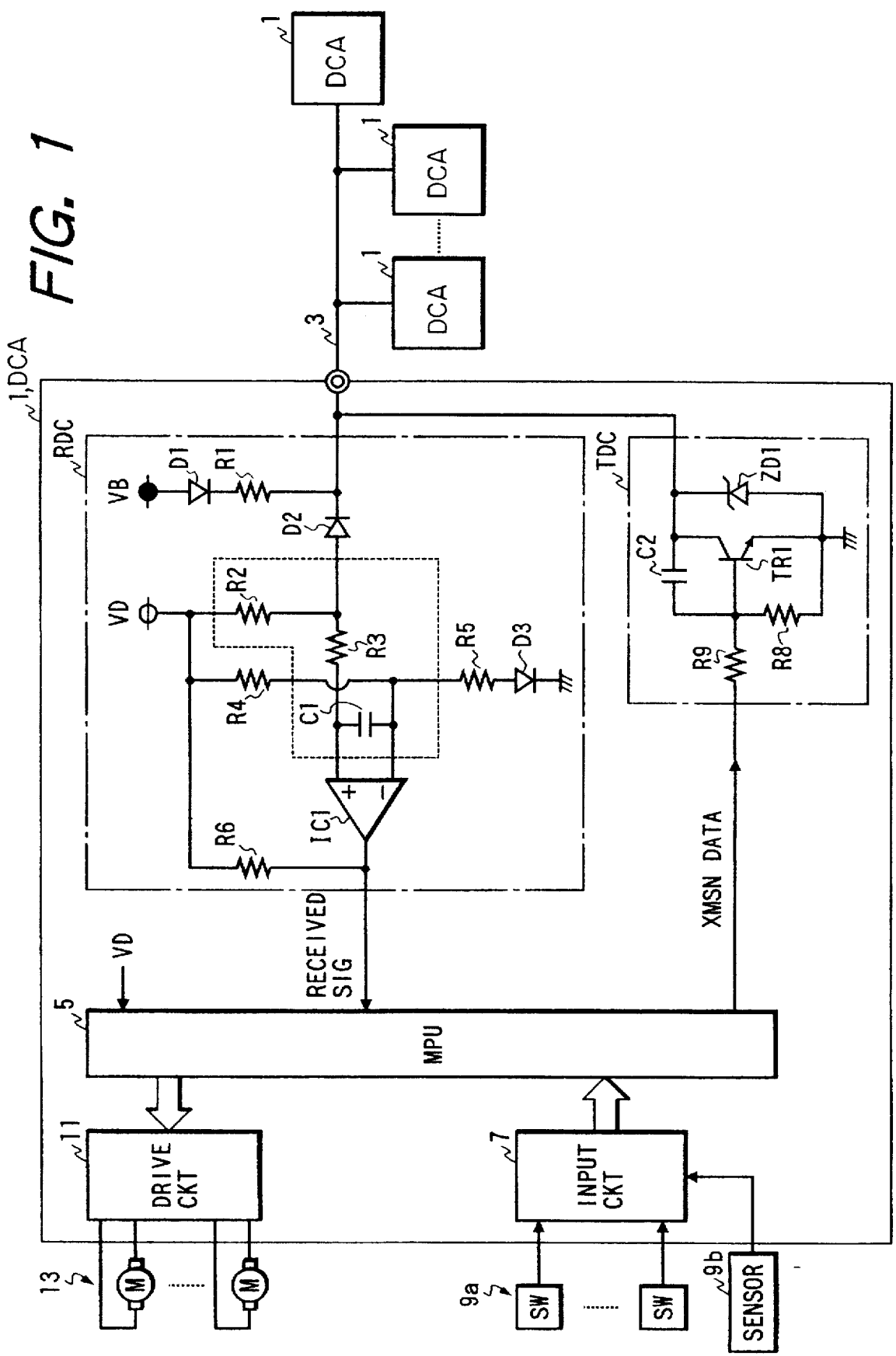
FIG. 1 is a block diagram of the data communication system of this embodiment.
Figure 2:
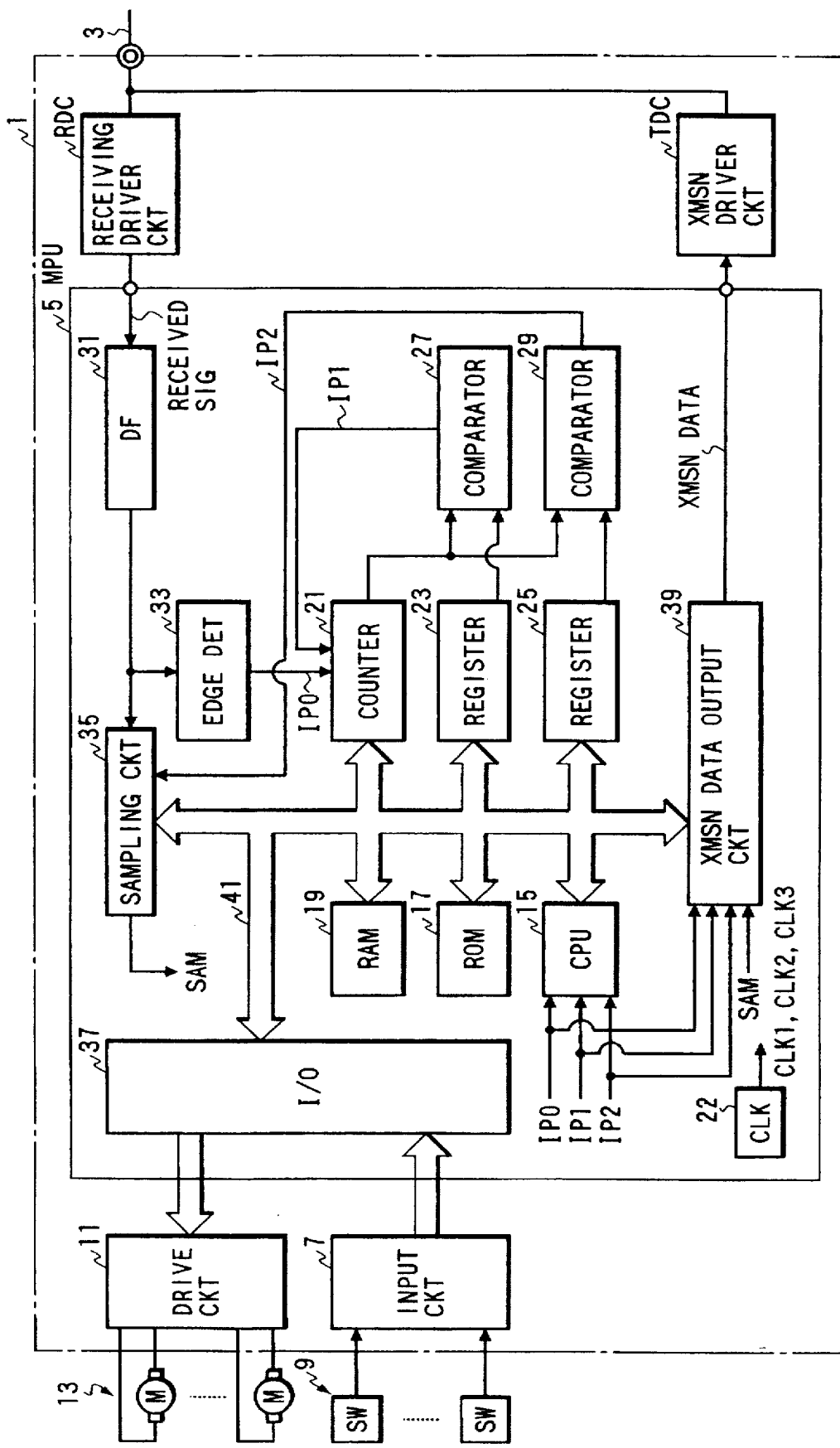
FIG. 2 is a block diagram of the communication apparatus of this embodiment shown in FIG. 1.
Figure 3:
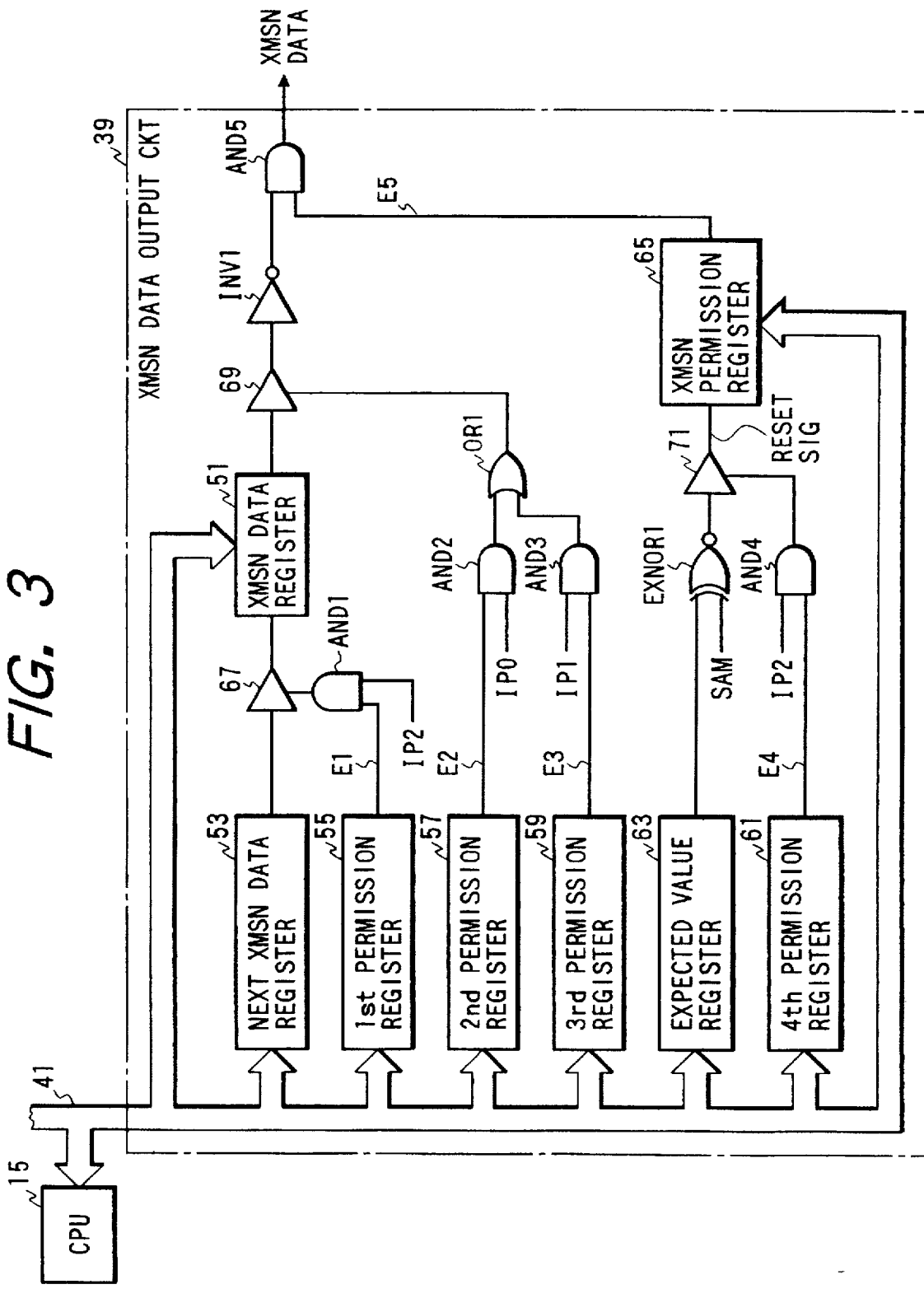
FIG. 3 is a block diagram of a transmission data output circuit shown in FIG. 2.

FIG. 1 is a block diagram of the data communication system of this embodiment, FIG. 2 is a block diagram of the communication apparatus of this embodiment shown in FIG. 1, and FIG. 3 is a block diagram of a transmission data output circuit shown in FIG. 2. In the data communication system according to this embodiment, a plurality of communication apparatus is coupled through a communication line 3. Each data communication apparatus 1 comprises a transmission driver circuit TDC for transmitting communication signals (transmission data) to the communication line 3 by changing a voltage level of the communication line 3 between the transmission of L and transmission of H levels to provide bi-directional data communication through the communication line 3. The data communication apparatus further includes a receiving driver circuit RDC for receiving the communication signal transmitted through the communication line 3, a single-chip microprocessor 5 for performing various communication processings by supplying transmission data to be transmitted to the transmission driver circuit TDC and by receiving a received signal from the receiving driver circuit RDC. Further, each of communication apparatus comprises an input circuit 7 for inputting signals from switches 9 or various sensors (not shown) into the microprocessor 5 and a driver circuit 11 for driving various actuators 13 such as a motor in response to a command from the microprocessor 5.

That is, in the data communication system of this embodiment, each communication apparatus 1 receives information from various switches or sensors as well as communicates data each other to drive and control the actuators in accordance with the information received thereby and data received from another data communication apparatus.

The receiving driver circuit RDC and the transmission driver TDC will be described.

The receiving driver circuit RDC comprises a diode D1 having an anode connected to a plus side of a battery (not shown) provided to the vehicle, a resistor R1, connected between the diode D1 and the communication line 3, for pulling up the communication line 3 to a battery voltage (normally, 12 V) as a transmission H level, a diode D2 having a cathode connected to a junction point between the resistor R1 and the communication line 3, and a resistor R2 for pulling up the anode of the diode D2 to a predetermined supply voltage (for example, 5 V) supplied to the microprocessor 5. The RDC further comprises a comparator IC1 having a non-inverted and an inverted inputs, a resistor connected in series between the non-inverted input of the comparator IC1 and the anode of the diode D2, resistors R4 and R5 for generating a reference voltage by dividing the supply voltage VD and supplying the reference voltage to the inverted input of the comparator IC1, a diode D3 connected between the ground and an end of the resistor R5 opposite to the resistor R4, a resistor R6 for pulling up an output terminal of the comparator IC1 to the supply voltage VD, and a capacitor C1 connected between the non-inverted and inverted terminals of the comparator IC1.

The diode D1 is provided for protecting respective portions in case of an inverse connection of the battery. The diode D2 is provided to prevent the battery voltage from entering the side of the supply voltage VD. The diode D3 is provided to compensate a voltage drop across the diode D2 which varies with a temperature thereof.

On the other hand, the transmission driver circuit TDC comprises an NPN transistor TR1 having a collector connected to the communication line 3, an emitter connected to the ground, and a base, a resistor R8, connected between the base and the emitter, for base biasing. The TDC further comprises a resistor R9 connected to the base of the transistor TR1 for base current limiting, a zener diode ZD1, connected between the collector and the emitter of the transistor TR1, for transistor protection, and a capacitor C2, connected between the collector and the base of the transistor TR1, for moderating the switching operation of the transistor TR1 to reduce radiation noises from the transmission line.

To the transmission driver circuit TDC and the receiving driver circuit RDC, the microprocessor 5 supplies data having a transmission level derived from inversion of the transmission data as described later. Therefore, the transistor TR1 of the transmission driver circuit TDC is switched in accordance with the data. Therefore, the voltage level of the communication line shows the battery voltage VB (the transmission H level) when the transmission data is "1" because the transistor TR1 is in an OFF state and the voltage level of the communication line 3 shows the ground potential (a transmission L level) when the transmission data is "0" because the transistor TR1 is in an ON state.

When the communication line 3 has a signal in the transmission H level, the comparator IC1 of the receiving driver circuit RDC outputs the transmission H level as a received signal because the voltage of the non-inverted input of the comparator IC1 is larger than the reference voltage at the inverted input. When the communication line 3 has a signal in the transmission L level, the comparator IC1 of the receiving driver circuit RDC outputs the transmission L level as a received signal because the voltage of the non-inverted input of the comparator IC1 is about 0.8 V (corresponding to a voltage drop of across the diode D2 and the transistors TR1) and is smaller than the reference voltage at the non-inverted input.

When the transistor TR1 of the transmission driver circuit TDC from the ON state to the OFF state and thus, the voltage level of the communication line 3 changes from the transmission L level to the transmission H level, the capacitor C1 in the receiving driver circuit RDC is charged by the supply voltage VD through the resistors R2 and R3. Therefore, the received signal changes from the transmission L level to the transmission H level.

When the transistor TR1 of the transmission driver circuit TDC changes from the OFF state to the ON state and thus, the voltage level of the communication line 3 changes from the transmission H level to the transmission L level, the charge charged in the capacitor C1 of the receiving driver circuit RDC is discharged through the resistor R3, the diode D2, and the transistor TR1 with a discharge interval. Therefore, the received signal changes from the transmission H level to the transmission L level with a delay time corresponding to the discharge interval by the supply voltage VD through the resistors R2 and R3.

That is, in the receiving driver circuit RDC, though the voltage level of the communication line 3 varies, the voltage level of the receiving signal does not change until the capacitor C1 has been charged or discharged. This prevents a change in the voltage level of the communication line 3 by noises. That is, in the receiving driver circuit RDC, the resistors R2 and R3 and the capacitor C1 act as a filter which is denoted by a chain line in FIG. 1.

In the data communication system according to this embodiment, when the transistors TR1 of the transmission driver circuit TDC in all communication apparatus 1 are not actuated, that is, no communication apparatus outputs transmission data to the communication line 3, the voltage level of the communication line 3 is the transmission H level.

Therefore, in this data communication system, the transmission H level is a passive level and the transmission L level is a dominant level.

The microprocessor 5 operates in response to a basic clock signal CLK1 generated by a clock generator 22 and comprises a central processing unit (cpu) 15 for successively executing various control processings in response to an operation clock signal CLK2 (for example, 1 MHz) obtained by dividing the basic clock signal CLK1 by four, a ROM 17 for storing programs of the various control processings to be executed by the central processing unit 15 and values to be set to various resistors described later, and a ram 19 for temporary storing operations result from the central processing unit 15 or other data, a counter 21 for effecting a count operation in response to the operation clock signal reset by interruption signals IP0 and IP1 mentioned later. The microprocessor further includes a first comparing register 23 for storing a value set thereto by the central processing unit 15, a second comparing register 25 for storing a value set thereto by the central processing unit 15, a first comparator 27 for comparing the value set in the first comparing register 23 with a count value in the counter 21 and for generating the timer interruption signal IP1 when the value in the first comparing register 23 agrees with the count value, and a second comparator 29 for comparing the value set in the second comparing register 25 with the count value in the counter 21 and for generating the timer interruption signal IP2 when the value in the second comparing register 25 agrees with the count value. The microprocessor also includes a majority filter 31 for sampling the received signal from the receiving driver circuit RDC in response to a clock CLK3 dividing the basic clock signal by two and generating a majority result from the last three sampled levels, and an edge detection circuit 33 for detecting an edge in the received signal from the majority filter 31 and generating an edge interruption signal IP0 when the edge is detected. The microprocessor further comprises a sampling circuit 35 for sampling the received signal from the majority filter 31 and outputting a sampled received signal, an I/O portion 37 for supplying drive signals to a driving circuit 11 and for inputting signals from the input circuit 7, a transmission data outputting circuit 39 for supplying transmission data generated by the central processing unit 15 to the transmission driver circuit TDC, and a data bus 41 coupling the respect portions mentioned above.

The transmission data outputting circuit 39 comprises, a transmission data register 51 for storing one bit of transmission data to be transmitted, a next transmission data register 53 for storing one bit of transmission data, to be transmitted after transmission of the transmission data stored in the transmission data register 51, which is written by the central processing unit 15, and first to fourth permission registers 55, 57, 59, and 61 storing one bit of permission data E1 to E4 set and reset by the central processing unit 15 respectively. The transmission data outputting circuit 39 further includes an expected value register 63 for storing the transmission data under transmission as an expected value set by the central processing unit 15, a transmission permission register 65 for storing one bit of permission data E5 set by the central processing unit 15 and reset when the expected value set in the expected value register 63 does not agree with the received data SAM sampled by the sampling circuit 35, and an AND gate AND1 for effecting an AND operation between the permission data E1 from the first permission register 55 and the second timer interruption signal IP2 from the second comparing portion 29. The transmission data outputting circuit 39 also includes an output buffer circuit 67 for latching and supplying the transmission data stored in the next transmission data register 53 to the transmission register 51 when the AND gate AND1 outputs a logic H level (VD), an AND gate AND2 for effecting an AND operation between the permission data E2 of the second permission register 57 and the edge interruption signal IP0 from the edge detection portion 33, an AND gate AND3 for effecting an AND operation between the permission data E3 from the third permission register 57 and the first timer interruption signal IP1 from the first comparator 27, and an OR gate OR1 for effecting an OR operation between an output signal of the AND gate AND2 and an output of the AND gate AND3. The transmission data outputting circuit 39 further comprising an output buffer circuit 69 for latching and outputting the transmission data stored in the transmission data register 51 when the OR gate OR1 outputs the logic H level, an inverter INV1 for inverting the transmission data from the output buffer circuit 69, an EXCLUSIVE NOR gate EXNOR1 for effecting EXCLUSIVE NOR operation between the expected value set by the expected value register 63 and the received data SAM sampled by the sampling portion 35, and an AND gate AND4 for effecting an AND operation between the permission data E4 from the fourth permission register 61 and the second timer interruption signal IP2 from the second comparing portion 29. The transmission data outputting circuit 39 also comprising an output buffer circuit 71 for latching and supplying an output signal from the EXCLUSIVE NOR gate EXNOR1 to a reset input of the transmission register 65 when the AND gate AND1 outputs the logic H level, and an AND gate AND5 for effecting an AND operation between the transmission data from the inverter INV1 and the permission data E5 from the transmission permission register 65 and supplying the result to the transmission drier circuit TDC.

Figure 4:
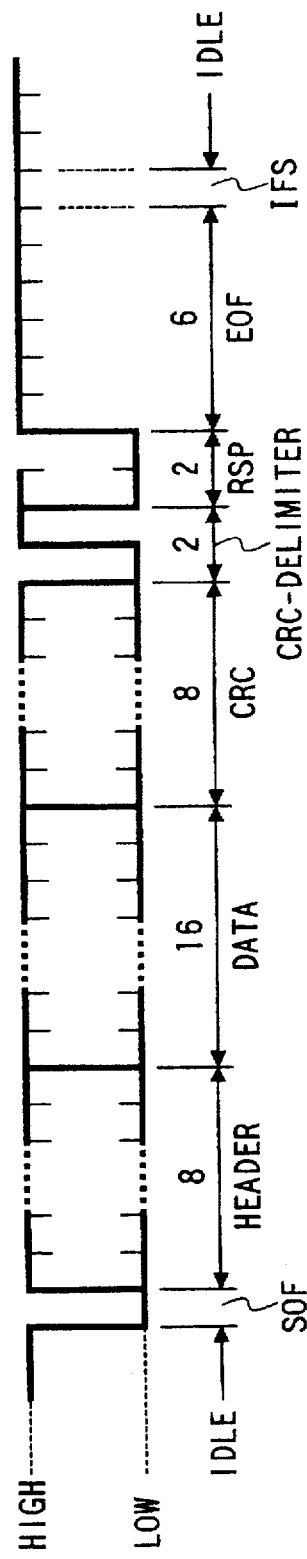
FIG. 4 is a diagram of a frame format of data used in the communication system of this embodiment.

The communication apparatus 1 communicates data with a frame format as shown in FIG. 4 to each other.

In this embodiment, the voltage level of the communication line 3 having the transmission H level is an idle state, which is a condition when no communication apparatus 1 transmits transmission data to the communication line 3. A communication apparatus 1 trying a communication (transmission communication apparatus) first detects the idle state IDLE and outputs a start bit SOF which is one bit and L level. The communication apparatus then, successively outputs eight bits of a header HEADER representing an identification code of the communication apparatus 1, an identification code of a destination or the like, sixteen bits of data DATA, eight bits of data CRC for error checking, two bits of data CRC-Delimiter representing an end of CRC which are the transmission H and L levels, two bits of data RSP for confirming the presence of a communication error, six bits of the transmission H level signal EOF representing the end of the frame, and one bit of the transmission H level signal IFS for clock signal error compensation. One of the other communication apparatus 1 having its identification code corresponding to the identification code of the destination judges itself as to a destination communication apparatus when it is not in a transmission condition. This destination communication apparatus 1 determines any error is in the received signal in accordance with the data CRC. When the destination communication apparatus 1 detects an error, the destination communication apparatus 1 outputs a signal having the transmission L level for two bit intervals at the same timing as the data RSP is to be transmitted. Therefore, the transmitting communication apparatus 1 observes the first bit of the data RSP outputted by itself and judges that there is no transmission error when the first bit is the transmission H level and the second bit is transmission L level and judges that there is an error on the destination side when the first bit is the transmission L level.

The transmission communication apparatus 1 confirms whether or not the transmitted data outputted by itself occurs on the communication line 3, bit by bit. If data on the communication line 3 which is the same data transmitted by itself does not occur on the communication line 3, the transmission communication apparatus 1 judges that another communication apparatus is transmitting and stops its transmission until the communication line 3 enters the idle state IDLE. That is, when one communication apparatus outputs data of the transmission H level (passive level) and another communication apparatus outputs data of the transmission L level (dominant level), the voltage level of the communication line 3 is the transmission L level. Therefore, the transmitting communication apparatus 1 detects a collision of communication by detecting the transmission L level at that timing and, thus, stops the communication until the communication line enters the idle state.

The control operation by the microprocessor 5 will be described. FIGS. 5A to 5C and 6 to 8 are diagrams of flow charts of this embodiment.

When a power of this data communication system is turned on, the central processing unit 15 of each communication apparatus 1 is initialized and the counter 21 is reset by a power-on reset circuit (not shown). Then, the central processing unit 15 executes an initializing processing in a main routine (not shown) as follows.

The central processing unit 15 sets the value N1 to the first comparing register 23 to measure the one bit interval T1 by counting N1 pulses of the clock signal CLK1. Similarly, the central processing unit 15 sets the value N2 to the second comparing register 25 to measure the sampling interval T2 by counting N2 pulses of the clock signal CLK1 from the start of a bit to the sampling timing. For example, assuming that the one bit interval is 200 μs and the operation clock signal is 1 MHz, a value "200" is set to the first comparing register 23 as N1 and a value N2 which is smaller than N1 (for example, a value "100") is set to the second comparing register 25. The central processing unit 15 sets a value "1" (the logic H level) corresponding to the passive level on the communication line 3 to the transmission data register 51, the next transmission data register 53, and the expected value register 63. The central processing unit is sets data "0" (a logic L level) indicative of inhibition to the first to fourth permission registers 55 to 61 and the transmission permission register 65 as the permission data E1 to E5 during this initializing processing.

On the other hand, when the interruption signals IP0, IP1, and IP2 occur at substantially the same time, the central processing unit 15 executes the IP0 interruption processing in response to the edge interruption signal IP0 from the edge detection portion 33 prior to the other interruptions. Then, the central processing unit 15 executes the IP1 interruption processing in response to the first timer interruption signal IP1 from the first comparator 27 prior to the IP2 interruption processing. That is, the second timer interruption IP2 in response to the second timer interruption signal IP2 has the lowest priority among these interruption processings. After the initializing operation, the central processing unit 15 executes a control operation for receiving the input signal from the input circuit 7 and for controlling the drive circuit 11 in accordance with the received input signal and the transmission data from the other communication apparatus in the main routine (not shown). The transmission data is received or transmitted through the interruption processings with the other circuitry in the communication apparatus.

Figure 5C:
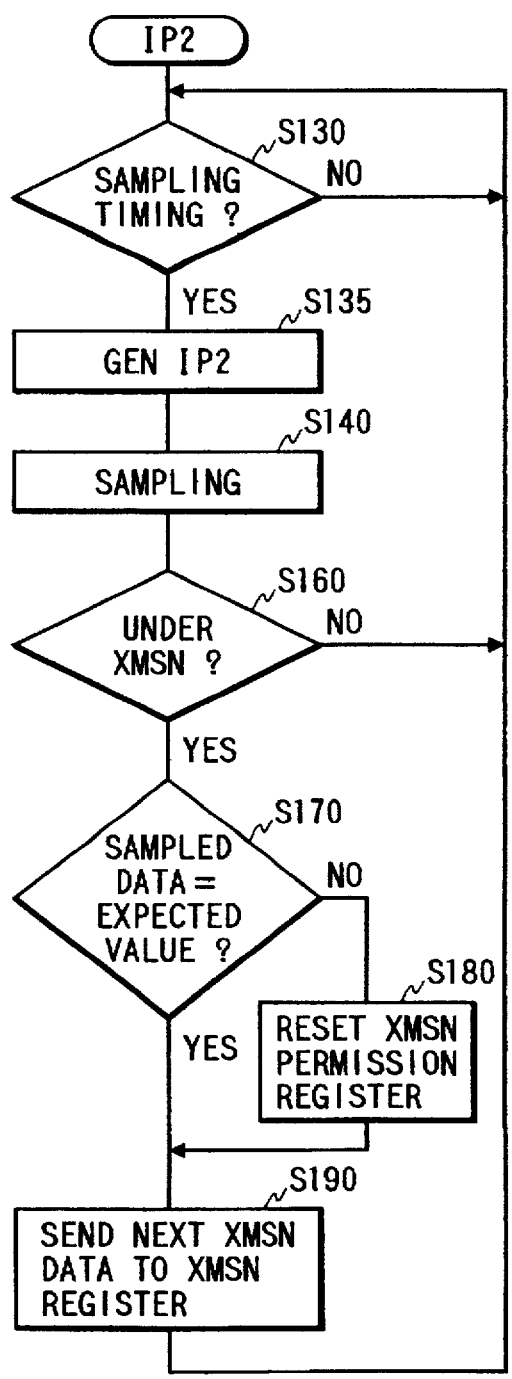

FIGS. 5A to 5C are diagrams of flow charts of this embodiment. The flow chart shown in FIG. 5A represents a circuit operation accompanied with the edge detection by the edge detection circuit 33. The flow chart shown in FIG. 5B represents a circuit operation accompanied with the one bit interval T1 measuring operation. The flow chart shown in FIG. 5C represents a circuit operation accompanied with the sampling timing determining operation. These operations are made in parallel.

When the count value in the counter 21 reaches the value N2 (S130), the second comparator 29 generates the interruption signal IP2 in step S135. Therefore, the sampling circuit 35 samples a level of the received signal from the majority filter 31 in step S140.

On the other hand, in response to the interruption IP2, the central processing unit 15 executes the interruption IP2 processing.

In the following step s160, if this communication apparatus 1 is in a transmitting state and if values "1" are set to the first to fourth permission register 55 to 61 and the transmission permission register 65 as permission data E1 to E5, then operations from steps s170 to s190 are made. In step s170, the expected value set in the expected value register 63 (transmission data under transmission) is compared with the received data SAM sampled by the sampling circuit 35 by the EXCLUSIVE NOR gate EXNOR1. If both data do not agree each other, the EXCLUSIVE NOR gate EXNOR1 outputs the logic L level. On the other hand, the AND gate AND4 supplied with the interruption signal IP2 supplies the logic H level to the output buffer circuit 71. Then, the output buffer circuit 71 latches the L logic level from the EXCLUSIVE NOR gate EXNOR1 and supplies it to a reset input of the transmission permission register 65. Therefore, the transmission permission register 65 is reset in step s180.

On the other hand, when the timer interruption signal IP2 is outputted from the second comparator 29, the AND gate AND1 outputs the logic H level. Therefore, the output buffer 67 latches the data stored in the next transmission data register 53 and supplies the data to the transmission data register 51 in step s190.

Figure 6:
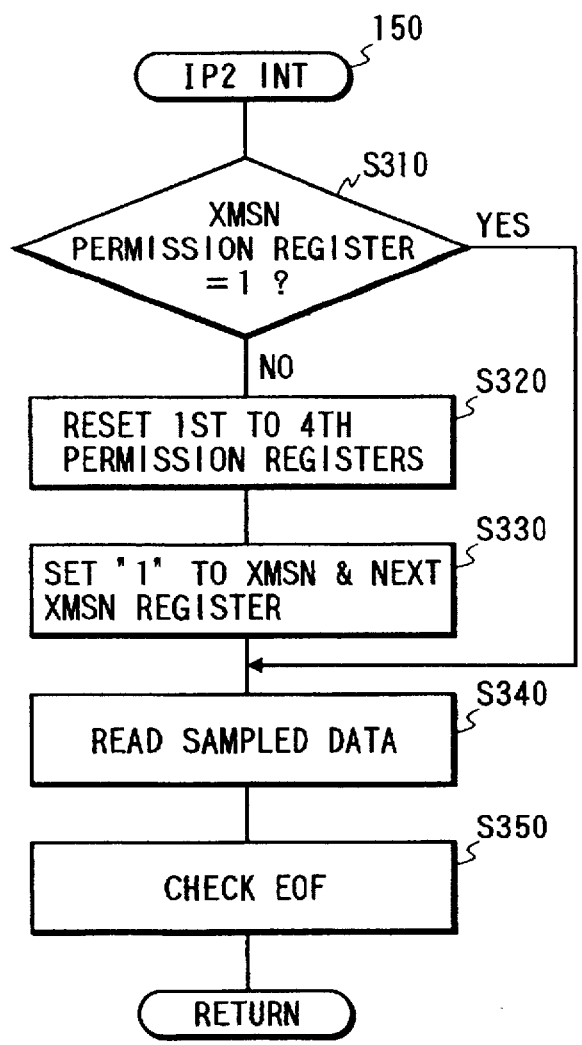
FIG. 6 is a flow chart of the IP2 interruption processing executed by the central processing unit shown in FIG. 2.

FIG. 6 is a flow chart of the IP2 interruption processing. As mentioned above, the central processing unit 15 executes the IP2 interruption processing in response to the interruption signal IP2. In step s310, the central processing unit 15 makes a decision as to whether or not the value stored in the transmission permission register 65 is "1". If the transmission permission register 65 does not store "1", i.e., the transmission register 65 is reset, the central processing unit 15 resets the first to fourth permission registers 55 to 61. In the following step s330, the central processing unit 15 stores a value "1" corresponding to the passive level into the transmission register 51 and the next transmission data register 53.

After executing the step s330 or s310, the central processing unit 15 reads the sampled data from the sampling circuit 35 and stores the sampled data into the RAM 19. In the following step s350, the central processing unit 15 checks the EOF, that is, the central processing unit 15 judges the EOF indicative of the end of transmission from another communication apparatus, by detecting that the received data SAM is "1" for continuous six bit intervals.

Then, the counting in the counter 21 advances and when the count value in the counter 21 reaches the value N1 and the first comparator 27 detects this, that is, detects that the one-bit interval T1 has passed, in step s120, the first comparator 27 generates the timer interruption signal IP1 in step s125. In the following step s200, the counter 21 is reset by the timer interruption signal IP1. Then, if this communication apparatus 1 is in the transmitting state and when values "1" are set to the first to fourth permission registers 55 to 61 and the transmission permission register 65 as permission data E1 to E5, then operations of step s230 are made.

In step 230, the transmission data is outputted. That is, when the timer interruption signal IP1 is outputted from the first comparator 27, the AND gate AND 3 outputs the logic H level, so that the OR gate OR1 outputs the logic H level. Therefore, the output buffer circuit 69 latches the transmission data stored in the transmission data register 51. The transmission data from the transmission data register 51 is inverted by the inverter INV1 and supplied to the transmission driver circuit TDC through the AND gate AND5.

Figure 7:
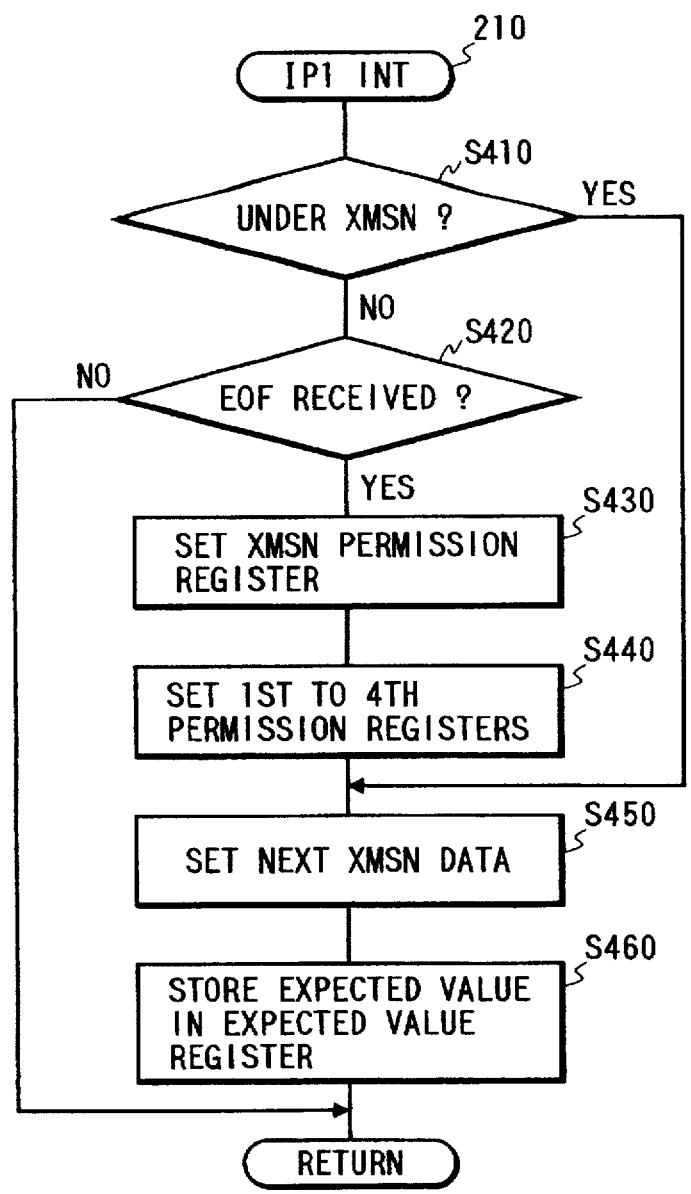
FIG. 7 is a diagram of a flow chart of the interruption IP1 processing of this embodiment executed by the central processing unit shown in FIG. 2.

On the other hand, in response to the timer interruption signal IP1, the central processing unit 15 executes the interruption IP1 processing. FIG. 7 is a diagram of a flow chart of the interruption IP1 processing of this embodiment. In step s410, the central processing unit 15 makes a decision as to whether or not this communication apparatus 1 is in the transmitting state, that is, as to whether or not a value "1" is stored in the transmission permission register 65. If "1" is stored in the transmission permission register 65, this communication apparatus 1 is judged to be in the transmitting state.

In the step s410, if this communication apparatus 1 is not in the transmitting state, the central processing unit 15 makes whether or not the EOF has been received in step s350 in the interruption IP2 processing. If the EOF has not been received, processing returns to the main routine. In step s420, if the EOF has been received, the central processing unit 15 sets "1" to the transmission permission register 65 in step s430 and sets "1" to the first to fourth permission registers 55 to 61 in step s440.

After processing in step s440 or s410, in the following step s450, the central processing unit 15 sets next transmission data to the next transmission data register 53. Then, in step s460, the central processing unit 15 stores the transmission data under transmitting, namely, the data stored in the transmitting data register, into the expected value register 63 as the expected value and processing returns to the main routine.

On the other hand, when an edge is detected by the edge detection circuit 33 in step s110 during the operation from steps s120 to s230, the edge detection circuit 33 generates the interruption signal IP0 in step s115. In the following step s240, the interruption signal IP0 clears the counter 21.

If the communication apparatus 1 is in the transmitting state in step s260, that is, values "1" are stored in the first to fourth registers 55 to 61 as permission data E1 to E5 and in the transmission permission register 65, step s270 is executed. That is, in response to the edge interruption signal IP0 is generated from the edge detection portion 33, the AND gate AND2 outputs the logic H level. Therefore, the OR gate OR 1 outputs the logic H level, so that the OR gate OR1 outputs the logic H level. Thus, similar to the first timer interruption signal IP1, the output buffer circuit 69 latches the transmission data stored in the transmission data register 51. The transmission data from the transmission data register 51 is inverted by the inverter INV1 and supplied to the transmission driver circuit TDC through the AND gate AND5. As mentioned above, the transmission data is transmitted in response to the edge interruption signal IP0 and the first timer interruption IP1.

Figure 8:
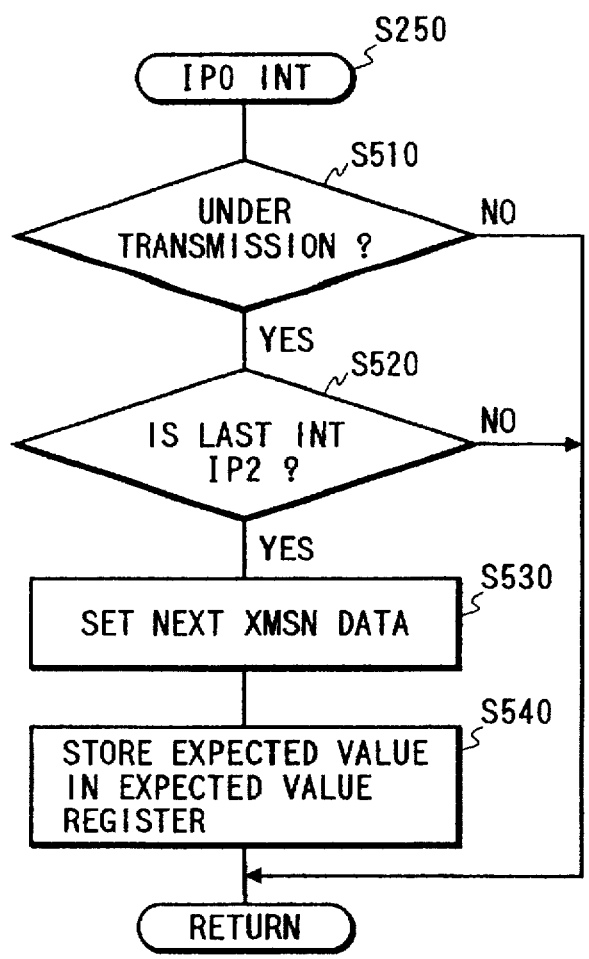
FIG. 8 is a diagram of a flow chart of the IP0 interruption processing of this embodiment executed by the central processing unit shown in FIG. 2.

FIG. 8 is a diagram of a flow chart of the IP0 interruption processing of this embodiment. In response to the interruption signal IP0, the central processing unit 15 executes the IP0 interruption processing. At first, the central processor 15 makes a decision as to whether or not this communication apparatus 1 is in the transmitting state in step s510. That is, similar to the step s410, the judgement is made as to whether the value "1" is set to the transmission permission register 65. If the value "1" is set in the transmission permission register 65, this communication apparatus 1 is in the transmitting state.

If in step s510, this communication apparatus 1 is judged to be not in the transmitting state, processing directly returns to the main routine. If in step s510, this communication apparatus 1 is judged to be in the transmitting state, in step s520, the central processing unit 15 makes a decision as to whether or not the last interruption processing is the IP2 interruption. If the last interruption is judged to be not the IP2 interruption processing in step s520, processing directly returns to the main routine also. If the last interruption is judged to be the IP2 interruption processing in step s520, the central processing unit 15 stores next transmission data to be transmitted at the next transmission operation in the next transmission data register 53. Then, in step s540, the central processing unit 15 stores the transmission data under transmission in the expected value register 63 as the expected value and processing returns to the main routine.

Figure 9:
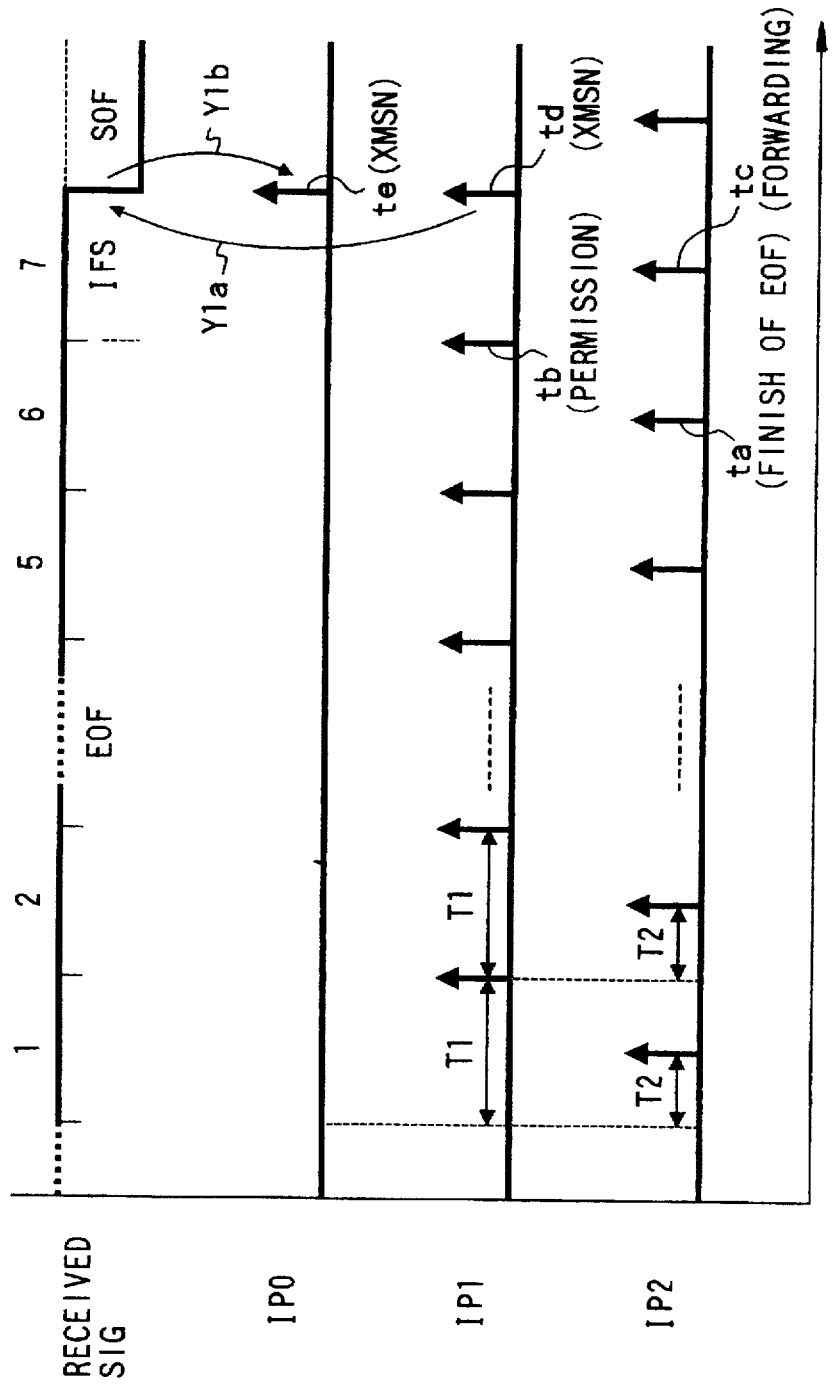
FIG. 9 is a diagram of a time chart of a transmission start operation of this embodiment.

A transmission start operation will be described. FIG. 9 is a diagram of a time chart of transmission start operation of this embodiment. FIG. 9 shows a condition of this communication apparatus when this communication apparatus 1 begins the transmission just after the power on of this data communication system and wherein the voltage level of the communication line 3 is continuously H level.

After initialization in response to the power on, if the count value in the counter 21 agrees with the value N2 set in the second comparing register 25, the second timer interruption signal IP2 is generated. In response to the interruption signal IP2, the sampling circuit 35 samples the level of the received signal and the central processing unit executes the IP2 interruption processing.

However, in this condition, the value "1" is not set to the transmission permission register 65 and first to fourth permission registers 55 to 61, and this communication apparatus is not in the transmission state, so that the outputs of the AND gates AND1 and AND4 stay the logic L level and processing from step s170 to s190 in FIG. 5C is not executed. Moreover, the first to fourth permission registers 55 to 61 remain "0" because they are reset by the IP2 interruption processing steps s320 and s330 (FIG. 6) and the transmission data register 51 and the next transmission data register 53 remain "1" corresponding to the passive level, That is, in this condition, the transmission operation of this communication apparatus 1 is inhibited but only the receiving operation is executed such that the received data SAM sampled is stored in the RAM 19.

When the count value in the counter 21 agrees with the value N1 set in the first comparing register 23, the first timer interruption signal IP1 is outputted from the first comparator 27, the counter 21 is cleared, and the central processing unit 15 executes the IP1 interruption processing. However, in this instance, because the communication apparatus 1 is also not in the transmitting state, the output of the AND gate AND3 remains the logic L level. Therefore, the transmission operation in step s230 shown in FIG. 5B is not executed. Moreover, the finish of the confirmation of EOF has not executed, the IP1 interruption processing finishes without the execution of the operations from steps s430 to s460 for the transmission operation.

Then, the counter 21 is reset every generation of the first timer interruption signal IP1, so that as shown in FIG. 9, the first timer interruption signal IP1 is generated every one bit interval T1 and the central processing unit 15 executes the IP1 interruption processing in response to the first timer interruption signal IP1. Moreover, the central processing unit 15 executes the IP2 interruption processing in response to the second timer interruption signal IP2 every sampling interval T2 has passed after the generation of the first timer interruption signal IP1.

Then, at instance ta after the IP2 interruption processing is executed six times, in step s350, the finish of the EOF is detected in step s350 of this IP2 interruption operation.

Then, at a instance tb in the following IP1 interruption processing, processing from steps s430 to s460 are are executed, so that the value "1" is set to the transmission permission register 65 and to the first to the fourth permission registers 55 to 61 and the value "0" indicative of SOF as the next transmission data to be transmitted next is set to the next transmission data register 53. Moreover, the value "1" stored in the transmission data register 51 is set to the expected value register 63 to prepare the transmission operation in the following cycle.

When, at an instance tc, the second timer interruption signal IP2 is generated, the AND gates AND1 and AND4 are enabled, by the first to fourth registers 55 to 61, so that the operations from step s170 to s190 are executed and the transmission data "0" stored in the next transmission data register at the instance tb during the IP1 interruption processing is forwarded to the transmission register 51. In this operation, because the initial value "1" is stored in the expected value register 63, the central processing unit 15 judges that the expected value agrees with the sampled data, so that the transmission permission register 65 is not reset.

Then, at an instance td, when the first timer interruption signal IP1 is generated, the transmission data ("0" indicative of SOF) stored in the transmission data register 51 is inverted by the inverter INV1 and supplied to the transmission driver circuit TDC through the AND gate AND5 as the result of the processing in step s230 because the AND gate AND3 is enabled by third permission register 59. Then, the transistor TR1 in the transmission driver circuit TDC turns on, so that as shown by an arrow Y1a, the voltage level of the communication line 3 transients from the transmission H level to the transmission L level and the SOF indicating of a top of a frame is supplied to the communication line 3. That is, the transmission operation starts from this instance.

Moreover, the transmission data to be transmitted after the SOF (first bit of a header) is stored in the next transmission data register 53 by the IP1 interruption processing currently executed and the current transmission data ("0") is stored in the expected value register 63.

Then, when the voltage level of the communication line 3 transients to the transmission L level, there is a falling edge in the received signal. The edge detection circuit 33 detects the occurrence of the edge and generates the edge interruption signal IP0 as shown by an arrow Y1b at an instance te.

Then, in this case, the counter 21 is reset as shown in step s240 and the AND gate AND2 is enabled by the second permission register 57, so that the transmission data stored in the transmission data register 51 is outputted by the output buffer circuit 69 in step s270. As mentioned, if an edge occurs in the received signal by transmission by itself, the transmission data in the transmission data register 51 has not been renewed, so that the data which is the same as the data outputted in response to the first timer interruption signal IP1 is outputted. Moreover, in the IP0 interruption processing executed by the central processing unit 15, in step s520, the central processing unit 15 judges that the last interruption processing is not the IP2 interruption processing, so that the processing in step s530, i.e., storing the data in the next transmission data register 53, is not executed. Therefore, such an operation provides no adverse affection for transmission.

The counter 21 is rest by any of the edge detection, so that after detection of the edge, the sampling interval T2 and the one-bit interval T1 are measured on the basis of the instance of the edge detection.

Then, every generation of the second timer interruption signal IP2, the expected value set in the expected value register 63 is compared with the received data SAM sampling at this sampling (step s170), and the transmission data transferred from the next transmission data register 53 to the transmission data register 51 is executed in step s190. Then, every occurrences of the first timer interruption signal IP1 and the edge detection signal IP0, the transmission data transferred to the transmission data register 51 in response to the second timer interruption signal is outputted in step s230 or s270, the next transmission data is stored in the next transmission data register 53 in step s450 or s530, and the expected value is stored in the expected value register 63 in step s460 or s540. The transmission operation mentioned above is executed to transmit the transmission data successively.

During the transmission operation, if the expected value, namely, the transmission data under transmitting, does not agree with the received data SAM at the occurrence of the second timer interruption signal IP2 in step s170, the transmission permission register 65 is reset and the AND gate AND5 is forced to output the logic L level. Therefore, the transmission operation stops in step s180. Moreover, as the transmission permission register 65 is reset, the first to fourth permission registers 55 to 61 are also reset by the steps s320 and s330 response to the second timer interruption signal IP2 and the initial value "1" corresponding to the passive level is stored in the transmission register 51 and the next transmission data register 53.

When the communication apparatus 1 restarts the transmission operation after the transmission permission register 65 is reset, the same operation as the operation at the power-on mentioned above is executed.

That is, the other communication apparatus 1 under transmitting outputs the signal having total seven bits of H level (EOF and IOF) when the transmission is finished, the communication apparatus under stopping of the transmission operation confirms the finish of the EOF when the received data SAM are continuously "1" for six bit intervals in step s350 in the IP2 interruption processing. Then, in the following IP1 interruption processing, the central processing unit 15 set "1" to the transmission permission register 65 and the first to fourth permission registers 55 to 61 and the central processing unit 15 stores the transmission data (SOF "1") to be transmitted next in the next transmission data register 53. The central processing unit 15 transfers the transmission data from the next transmission data register 53 to the transmission data register 51 in response to the following second timer interruption signal IP2 to restart the transmission.

Figure 10:
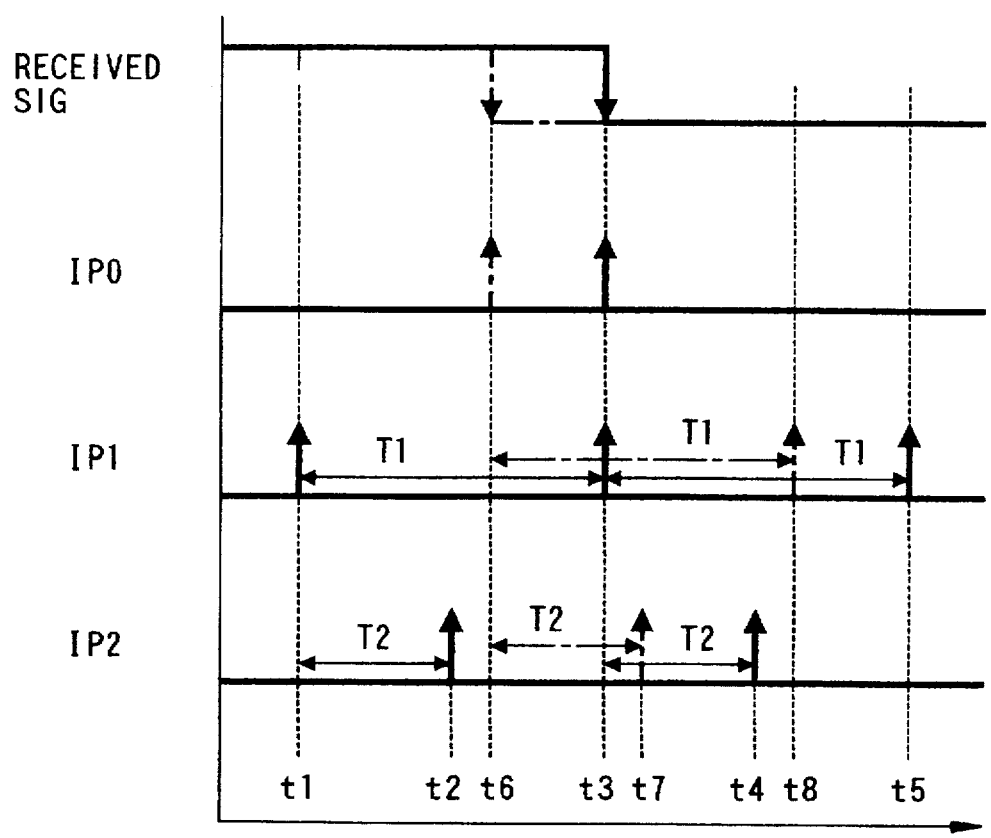
FIG. 10 is a diagram of a time chart of the transmission start operation wherein two communication apparatus output data of "1, 0, 0"
Figure 11:
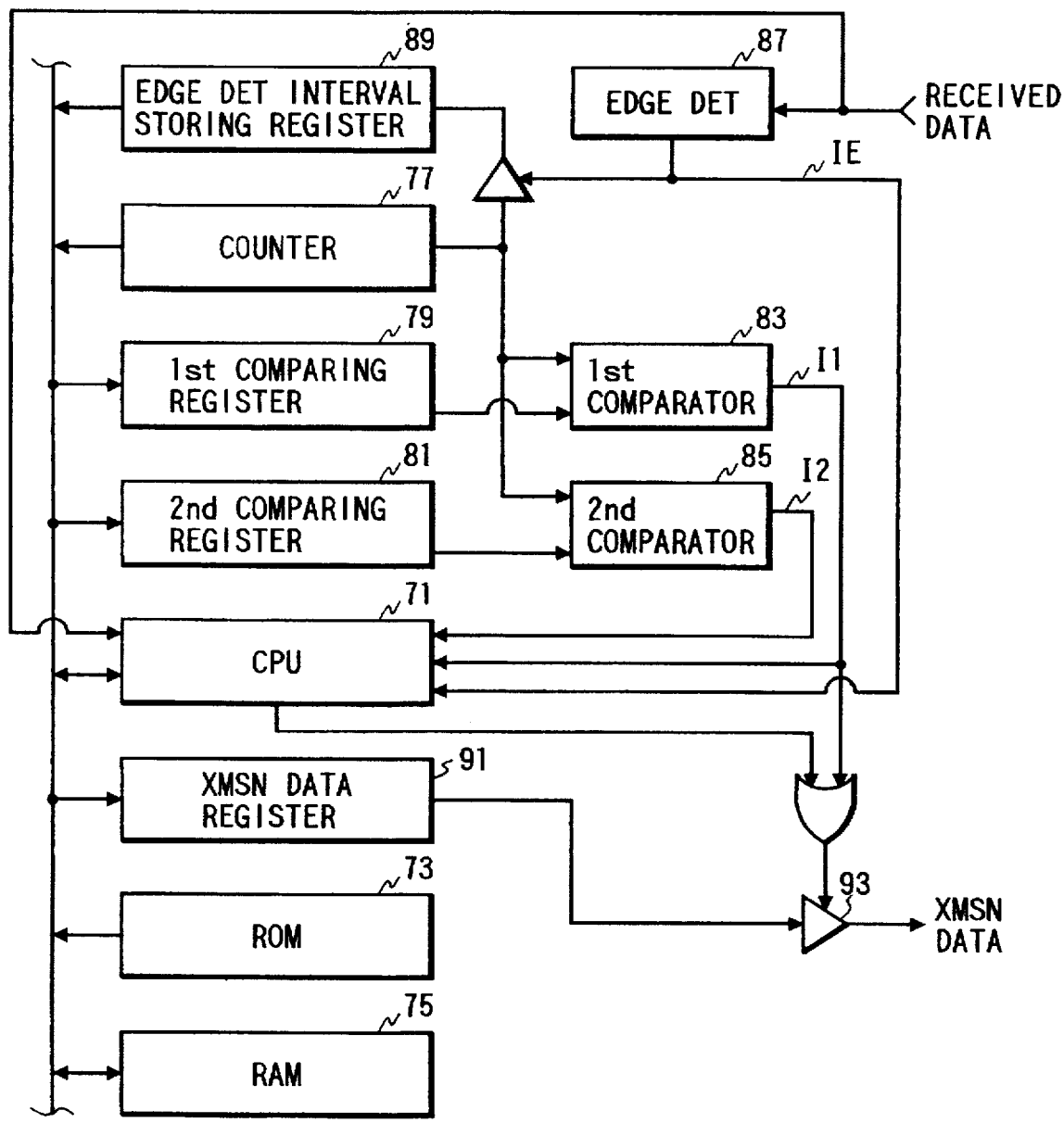
FIG. 11 is a block diagram of a prior art microprocessor used in the prior art communication apparatus employing the non-destructive arbitration.

A transmission operation at a start of transmission or in the case where a plurality of communication apparatus transmit the same data. FIG. 10 is a time chart of the transmission start operation wherein two communication apparatus output data of "1, 0, 0". Moreover, it is assumed the transmission data means the output of the output buffer circuit 69 supplied to the inverter INV1 in the description hereinafter.

When the communication apparatus 1 transmits data at earlier timing than the other communication apparatus 1 due to a phase deviation of the clock signals among the communication apparatus 1, an edge in the received signal generated by the transmission data transmitted by itself as shown by the solid line in FIG. 10 at t3.

Prior to the transmission of the transmission at t3, this communication apparatus 1 transmits transmission data "1" at t1 when the first timer interruption signal IP1 is outputted and a next transmission data "0" is stored in the next transmission data register 53. Then, this communication apparatus 1 transfers the data "0" stored in the next transmission data register 53 to the transmission data register 51. Then, at t3, the transmission data "0" stored in the transmission data register 51 at t3 in response to the first timer interruption signal IP1 and next transmission data "0" is stored in the next transmission data register 53.

Then, a falling edge occurs in the received signal around t3 and the edge interruption signal IP0 is generated. In this case, similar to the timing te shown in FIG. 9, the output buffer 69 outputs the transmission data which is the same as the data outputted in response to the first timer interruption signal IP1 just before this falling edge and the next transmission data is not stored in the next transmission data register 53. Therefore, this transmission has no effect.

After this operation, the sampling interval T2 and the one bit interval T1 are measured on the basis the detection of the edge. Therefore, at t4, the second timer interruption signal IP2 is generated at t4 and the data "0" stored in the next transmission register 53 is transferred to the transmission data register 51. Then, the data "0" stored in the transmission data register 51 is outputted at t5 when the next first timer interruption IP1 is outputted.

On the other hand, in the case where other communication apparatus 1 transmits data earlier than this communication apparatus 1, an edge occurs in the received signal in response to the transmission data from the other communication apparatus 1 as show by an alternate long and short dash line. However, because the transmission data is not transmitted before the sampling timing of this communication apparatus 1 when it is assumed that the communication in this system is established, the falling edge occurs at t6 between t2 and t3.

Then, the microprocessor generates the edge interruption signal IP0 around t6, so that at t2, the data "0" transferred to the transmission data register 51 in response to the second timer interruption signal IP2 just before t6 is outputted. Moreover, in this case, the edge interruption signal IP0 is outputted after the second timer interruption signal IP2 is outputted, so that the central processing unit 15 executes the step s530 in the IP0 interruption processing and stores the data "0" in the next transmission data register 53 as the next transmission data.

In this case, also the sampling interval T2 and the one bit interval T1 are measured on the basis of the edge detection timing. Thus, at t7, in response to the next second timer interruption signal IP2, the data "0" stored in the next transmission data register 563 is transferred to the transmission data register 51 and at t8, the data "0" stored in the transmission data register 51 is transmitted.

That is, if one of other communication apparatus 1 changes the transmission data earlier than this communication apparatus 1, operations after t3 is shifted toward t6. Therefore, when a plurality of communication apparatus transmit data on the communication line 3 and one of the plurality of communication apparatus 1 transmits data at an earlier timing, the transmitting and receiving timings in the other communication apparatus 1 is changed to match the transmission and receiving timings of the communication apparatus transmitting data at an earlier timing to prevent the deviation in transmission and receiving operation timings between communication apparatus 1.

As mentioned above, the microprocessor 5 outputs the transmission data stored in the transmission data register 51 by the AND gate AND3, the OR gate OR1, and the output buffer circuit 69 every one bit interval T1 is measured and samples the received signal after the sampling interval T2 is measured from one bit interval T1 has been measured by the counter 21, the second comparing register 25, and the second comparator 29 and transfers the data to be transmitted next to the transmission data register 51. These operations are repeated to perform the data transmission and reception successively.

If the microprocessor 5 detects that the sampled received data SAM does not agree with the transmission data under transmitting at the sampling timing of the received signal, the microprocessor 5 stops the transmission by resetting the transmission permission register 65 and the first to fourth permission registers 55 to 61 until the finish of the EOF having H levels for consecutive six bit intervals.

Moreover, when an edge occurs in the received signal by the transmitted data from this communication apparatus or from the other communication apparatus 1 and the edge detection circuit 33 of this communication apparatus 1 detects the edge, the central processing unit 15 operates the output buffer 69 to supplies the transmission data currently stored in the transmission data register 51 to the transmission driver circuit TDC and at the same time, the counter 21 is cleared to reset the time measuring operation of the one bit interval T1 and the sampling interval T2. As result of this, the communication protocol of the start-stop synchronization system is provided.

In this embodiment, the output buffer circuit 69 for outputting the transmission data stored in the transmission data register 51 is directly responsive to the result of OR operation between the first timer interruption signal IP1 from the first comparator 27 and the edge interruption signal form the edge detection circuit 33.

Therefore, the output buffer circuit 69 operates in response to the detection of the edge by the edge detection circuit 33 and the transmission data currently stored in the transmission data register 51 can be outputted instantly.

That is, the timing of the transmission of data is determined by the edge detection by the edge detection circuit 33. More specifically, the output buffer 69 outputs the transmission data in response to the edge detection signal passing a signal pass from the edge detection circuit 33, the AND gate AND2, and the OR gate OR1 with a delay time defined by the output buffer 69, the AND gate AND2, and the OR gate OR1. This delay time is constant, so that the timing of the transmission of data is directly responsive to the edge detection signal. On the other hand, the interruption processings by the central processing unit 15 are provided for preparation of the transmission data and setting of permission data to the permission registers which do not directly determine the transmission of data. In other words, the hardware circuitry including the edge detection circuit 33, comparators 27 and 29, etc. are provided for determining the timing of this communication apparatus 1. On the other hand, the software processing are provided for preparation of the transmission of data and the circuit conditions in permission registers because the interruption operations cannot be executed at a constant timing. For example, if one interruption is requested while the other interruption is being executed, that interruption should wait the finish of the other interruption.

That is, according to this embodiment, the microprocessor 5 comprises the OR gate OR1 and the output buffer 69 and the OR gate OR1 effects the OR operation between the first timer interruption signal IP1 and the edge interruption signal IP0 and the output buffer 69 responds the OR result from the OR gat OR1. Therefore, when the edge detection interruption signal IP0 is outputted from the edge detection circuit 33 during the IP2 interruption processing by the central processing unit 15, the transmission data stored in the transmission data register 51 is immediately outputted.

Therefore, though a noise occurs in the transmission line, when this communication apparatus 1 is under transmitting and the central processing unit 15 is executing the IP2 interruption processing, the microprocessor 5 can immediately transmits the transmission data in response to the edge detection signal IP0. Moreover, all communication apparatus coupled to the communication line 3 are synchronized.

Moreover, in the microprocessor 5 of this embodiment, in the IP1 interruption processing and the IP0 interruption processing the next transmission data to be transmitted next is stored in the next transmission data register 53 by the central processing unit 15. When the second comparator 29 outputs the second timer interruption signal IP2, a circuit including the AND gate AND 1 and the output buffer circuit 67 transfers the transmission data stored in the next transmission register 53 to the transmission register 51.

Therefore, when the second comparator 29 outputs the second timer interruption signal IP2, the transmission data is immediately stored in the transmission data register 51 from the next data transmission register 53 through the output buffer circuit 67 irrespective of the operation condition of the central processing unit 15.

Moreover, in this microprocessor 5 of this embodiment, the sampling circuit 35 for sampling the received signal is formed in a hardware circuit in the microprocessor 5, so that in response to the second timer interruption signal IP2, the sampling circuit can immediately sample the received signal. Therefore, the sampling timing is stable.

Moreover, in this microprocessor 5 of this embodiment, in signal passes supplying the interruption signals IP0, IP1, and IP2 to the output buffer circuits 67 and 71, and the OR gate OR1, the AND gates AND1, AND2, AND3, and AND4 are provided, and one of inputs of each of the AND gates AND1, AND2, AND3, and AND4 is supplied with the permission data E1, E2, E3, or E4 which is set and reset by the central processing unit 15. Therefore, the operations of the output buffer circuits 67, 69, and 71 responsive to the IP0, IP1, or IP2 can be inhibited or permitted by the central processing unit 15.

As mentioned above, the communication apparatus 1, coupled to the communication line 3, for transmitting data to and receiving the transmitted data from another communication apparatus 1, comprises a single chip microprocessor 5 including a hardware circuit portion for receiving and transmitting data and a software driven portion including the central processing unit 15 and registers in the transmission data output circuit 39 for controlling the hardware circuit portion and preparing transmission data. The hardware portion including an edge detection circuit 33 for detecting an edge on the communication line 3 and generating an edge detection signal (the interruption signal) IP0; a first time measuring circuit including the counter 21, the first comparing register 23, and the comparator 27 for measuring a first predetermined (one bit) time interval T1 of one bit of the data in response to the edge detection signal IP0; and a second time measuring circuit including the counter 21, the second comparing register 25, and the second comparator 29 for measuring a second predetermined (sampling) time interval T2 shorter than the first predetermined time interval T1 in response to the edge detection signal IP0. The hardware portion further including the sampling circuit 35 for sampling the data on the communication line 3 in response to the second time measuring circuit; the transmission data storing circuit (transmission data register) 51 for storing the transmission data; the data writing circuit (buffer 67 and the AND gate AND1) for writing the transmission data from the software driven portion into the transmission data storing circuit 51 in response to the second time measuring circuit; and a data output circuit including the buffer 69, the AND gates AND2 and AND3, and the OR gate OR1, for receiving and holding the transmission data from the transmission data storing circuit and transmitting the transmission data to the communication line 3 as the data in response to the edge detection signal and the first time measuring circuit. The registers in the transmission data output circuit 39 act as a portion of the hardware portion and also as a portion of a software driven portion.

In this communication apparatus 1, the hardware circuit further comprises a next transmission data storing circuit (next transmission data register) 53 for storing the transmission data from the software driven portion and supplying the transmission data to the transmission data storing circuit 51. The data writing circuit (buffer 67 and the AND gate AND1) writes the transmission data from the next transmission data storing circuit 53 into the transmission data storing circuit 51 in response to the second time measuring circuit, and the software driven portion further comprises a writing portion (s450, s530) responsive to the edge detection signal and the first time measuring circuit for writing the transmission data from the software driven portion into the next transmission data storing circuit.

In the communication apparatus, the hardware circuit portion further comprises the comparing circuit, including the EXCLUSIVE NOR gate EXNOR and the buffer 71, for comparing the data sampled by the sampling circuit with the transmission data supplied to the communication line generated just before the sampling circuit samples the data and for inhibiting the data output circuit (69) from transmitting the transmission data to the communication line 3 when the data sampled by the sampling circuit 35 does not agree with the transmission data supplied to the communication line and the software driven portion may further comprise a judging portion (65, s420, s430) for judging whether or not a predetermined condition of transmitting the transmission data by the data output circuit is established and for inhibiting the data output circuit (69) to transmit the transmission data to the communication line 3 when the predetermined condition is not established until the predetermined condition is established. Further, the software driven portion further comprises an inhibiting portion, including the fourth permission register61 and the step s320, for inhibiting the comparing circuit (EXNOR) from permitting the data output circuit to transmit the transmission data to the communication line in response to the second time measuring circuit.

In the communication apparatus, the hardware circuit portion further comprises a data output inhibiting circuit (transmission permission register 65) for inhibiting the data output circuit from transmitting the transmission data to the communication line 3.

In the communication apparatus, the software driven portion further comprises an edge data output inhibiting portion (the second permission register 57) for inhibiting the data output circuit (69) from transmitting the transmission data to the communication line.

What is claimed is:

1. A communication apparatus, coupled to a communication line, for transmitting data to and receiving transmitted data from another communication apparatus, comprising a single chip microprocessor including a hardware circuit portion and a software driven portion for controlling said hardware circuit portion and preparing transmission data, said hardware portion comprising:

an edge detection circuit for detecting an edge from said transmitted data on said communication line and generating an edge detection signal;

a first time measuring circuit for measuring a first predetermined time interval of one bit of said data in response to said edge detection signal;

a second time measuring circuit for measuring a second predetermined time interval shorter than said first predetermined time interval in response to the edge detection signal;

a sampling circuit for sampling said transmitted data on said communication line in response to said second time measuring circuit;

a transmission data storing circuit for storing said transmission data;

a data writing circuit for writing said transmission data from said software driven portion in said transmission data storing circuit in response to the second time measuring circuit;

a data output circuit for receiving and holding said transmission data from said transmission data storing circuit and transmitting said transmission data to said communication line as said data in response to said edge detection signal and said first time measuring circuit; and a next transmission data storing circuit for storing said transmission data from said software driven portion and supplying said transmission data to said transmission data storing circuit, wherein said data writing circuit writes said transmission data from said next transmission data storing circuit into said transmission data storing circuit in response to said second time measuring circuit and said software driven portion further comprises writing means responsive to said edge detection signal and said first time measuring circuit for writing said transmission data from said software driven portion into said next transmission data storing circuit.

2. A communication apparatus as claimed in claim 1, wherein said hardware circuit portion further comprises data output inhibiting means for inhibiting said data output circuit from transmitting said transmission data to said communication line.

3. A communication apparatus as claimed in claim 1, wherein said software driven portion further comprises edge data output inhibiting means for inhibiting said data output circuit from transmitting said transmission data to said communication line.

4. A communication apparatus as claimed in claim 1, wherein said hardware circuit portion further comprises a clock circuit for generating a clock signal and at least one of said first and second time measuring circuits comprises a counting circuit for counting said clock signal, a register for holding a predetermined value, and a comparing circuit for comparing a count value in said counting circuit with said predetermined value in said first register.

5. A communication apparatus as claimed in claim 1, wherein said hardware circuit portion further comprises a clock circuit for generating a clock signal and a counting circuit for counting said clock signal, said first time measuring circuit comprises a first register for holding a first predetermined value and a first comparing circuit for comparing a count value in said counting circuit with said first predetermined value in said first register, and said second time measuring circuit comprises a second register for holding a second predetermined value and a second comparing circuit for comparing a count value in said counting circuit with said second predetermined value in said second register.

6. A communication apparatus as claimed in claim 1, wherein:

said hardware circuit portion further comprises a comparing circuit for comparing said data sampled by said sampling circuit with said transmission data supplied to said communication line generated just before said sampling circuit samples said transmitted data and for inhibiting said data output circuit from transmitting said transmission data to said communication line when said transmitted data sampled by said sampling circuit does not agree with said transmission data supplied to said communication line; and said software driven portion further comprises judging means for judging whether or not a predetermined condition of transmitting said transmission data by said data output circuit is established and for inhibiting said data output circuit to transmit said transmission data to said communication line when said predetermined condition is not established until said predetermined condition is established.

7. A communication apparatus as claimed in claim 2, wherein said software driven portion further comprises edge data output inhibiting means for inhibiting said data output circuit from transmitting said transmission data to said communication line.

8. A communication apparatus as claimed in claim 2, wherein said hardware circuit portion further comprises a clock circuit for generating a clock signal and at least one of said first and second time measuring circuits comprises a counting circuit for counting said clock signal, a register for holding a predetermined value, and a comparing circuit for comparing a count value in said counting circuit with said predetermined value in said first register.

9. A communication apparatus as claimed in claim 2, wherein said hardware circuit portion further comprises a clock circuit for generating a clock signal and a counting circuit for counting said clock signal, said first time measuring circuit comprises a first register for holding a first predetermined value, and a first comparing circuit for comparing a count value in said counting circuit with said first predetermined value in said first register, and said second time measuring circuit comprises a second register for holding a second predetermined value, and a second comparing circuit for comparing a count value in said counting circuit with said second predetermined value in said second register.

10. A communication apparatus, coupled to a communication line for transmitting data to and receiving transmitted data from another communication apparatus, comprising a single chip microprocessor including a hardware circuit portion and a software driven portion for controlling said hardware circuit portion and preparing transmission data, said hardware portion comprising:

an edge detection circuit for detecting an edge from said transmitted data on said communication line and generating an edge detection signal;

a first time measuring circuit for measuring a first predetermined time interval of one bit of said data in response to said edge detection signal;

a second time measuring circuit for measuring a second predetermined time interval shorter than said first predetermined time interval in response to the edge detection signal;

a sampling circuit for sampling said transmitted data on said communication line in response to said second time measuring circuit;

a transmission data storing circuit for storing said transmission data;

a data writing circuit for writing said transmission data from said software driven portion in said transmission data storing circuit in response to the second time measuring circuit;

a data output circuit for receiving and holding said transmission data from said transmission data storing circuit and transmitting said transmission data to said communication line as said data in response to said edge detection signal and said first time measuring circuit;

a comparing circuit for comparing said transmitted data sampled by said sampling circuit with said transmission data supplied to said communication line generated just before said sampling circuit samples said transmitted data and for inhibiting said data output circuit from transmitting said transmission data to said communication line when said transmitted data sampled by said sampling circuit does not agree with said transmission data supplied to said communication line; and said software driven portion further comprises judging means for judging whether or not a predetermined condition of transmitting said transmission data by said data output circuit is established and for inhibiting said data output circuit to transmit said transmission data to said communication line when said predetermined condition is not established until said predetermined condition is established.

11. A communication apparatus as claimed in claim 10, wherein said hardware circuit portion further comprises data output inhibiting means for inhibiting said data output circuit from transmitting said transmission data to said communication line.

12. A communication apparatus as claimed in claim 10, wherein said software driven portion further comprises inhibiting means for inhibiting said comparing circuit from permitting said data output circuit to transmit said transmission data to said communication line in response to said second time measuring circuit.

13. A communication apparatus as claimed in claim 10, wherein said software driven portion further comprises edge data output inhibiting means for inhibiting said data output circuit from transmitting said transmission data to said communication line.

14. A communication apparatus as claimed in claim 10, wherein said hardware circuit portion further comprises a clock circuit for generating a clock signal and at least one of said first and second time measuring circuits comprises a counting circuit for counting said clock signal, a register for holding a predetermined value, and a comparing circuit for comparing a count value in said counting circuit with said predetermined value in said first register.

15. A communication apparatus as claimed in claim 10, wherein said hardware circuit portion further comprises a clock circuit for generating a clock signal and a counting circuit for counting said clock signal, said first time measuring circuit comprises a first register for holding a first predetermined value, and a first comparing circuit for comparing a count value in said counting circuit for comparing a count value in said counting circuit with said first predetermined value in said first register, and said second time measuring circuit comprises a second register for holding a second predetermined value, and a second comparing circuit for comparing a count value in said counting circuit with said second predetermined value in said second register.

16. A communication apparatus as claimed in claim 11, wherein said software driven portion further comprises edge data output inhibiting means for inhibiting said data output circuit from transmitting said transmission data to said communication line.

17. A communication apparatus as claimed in claim 11, wherein said hardware circuit portion further comprises a clock circuit for generating a clock signal and at least one of said first and second time measuring circuits comprises a counting circuit for counting said clock signal, a register for holding a predetermined value, and a comparing circuit for comparing a count value in said counting circuit with said predetermined value in said first register.

18. A communication apparatus as claimed in claim 11, wherein said hardware circuit portion further comprises a clock circuit for generating a clock signal and a counting circuit for counting said clock signal, said first time measuring circuit comprises a first register for holding a first predetermined value, and a first comparing circuit for comparing a count value in said counting circuit with said first predetermined value in said first register, and said second time measuring circuit comprises a second register for holding a second predetermined value, and a second comparing circuit for comparing a count value in said counting circuit with said second predetermined value in said second register.

* * * * *